United States Patent [19]

Ruiter

[11] Patent Number: 5,275,065

[45] Date of Patent: Jan. 4, 1994

[54] VEHICLE TRANSMISSION SHIFTER WITH PARK LOCK CONTROLLED BY MAGNETIC LATCH

[75] Inventor: Andrew K. Ruiter, Spring Lake, Mich.

[73] Assignee: Grand Haven Stamped Products, Div. of JSJ Corporation, Grand Haven, Mich.

[21] Appl. No.: 955,989

[22] Filed: Oct. 2, 1992

[51] Int. Cl.5 .................. B60K 41/26; F16H 63/36
[52] U.S. Cl. ..................... 74/483 R; 192/4 A; 335/179; 335/229
[58] Field of Search .............. 74/483; 192/4; 335/179, 335/229

[56] References Cited

U.S. PATENT DOCUMENTS

| | | | |
|---|---|---|---|
| 3,755,766 | 8/1973 | Read, Jr. | 335/229 |
| 4,072,918 | 2/1978 | Read, Jr. | 335/236 |
| 4,683,452 | 7/1987 | Henley | 335/234 |
| 4,887,702 | 12/1989 | Ratke et al. | 192/4 A |
| 4,947,967 | 8/1990 | Kito et al. | 192/4 A |
| 5,150,593 | 9/1992 | Kobayashi et al. | 192/4 A X |

Primary Examiner—Allan D. Herrmann
Attorney, Agent, or Firm—Price, Heneveld, Cooper, DeWitt & Litton

[57] ABSTRACT

A shift mechanism for the transmission of a vehicle in which a locking arm is provided to prevent shifting of the shift lever, the locking condition of the locking arm being controlled by a magnetic latch which includes a permanent magnet that produces a magnetic flux to hold the arm in locked position. A coil is provided in the magnetic latch to produce a magnetic flux that opposes the magnetic flux produced by the permanent magnet to destroy the holding force of the permanent magnet when a brake switch is closed to energize the coil thus permitting the locking arm to be moved to an unlocked position and the shift lever to be shifted.

19 Claims, 3 Drawing Sheets

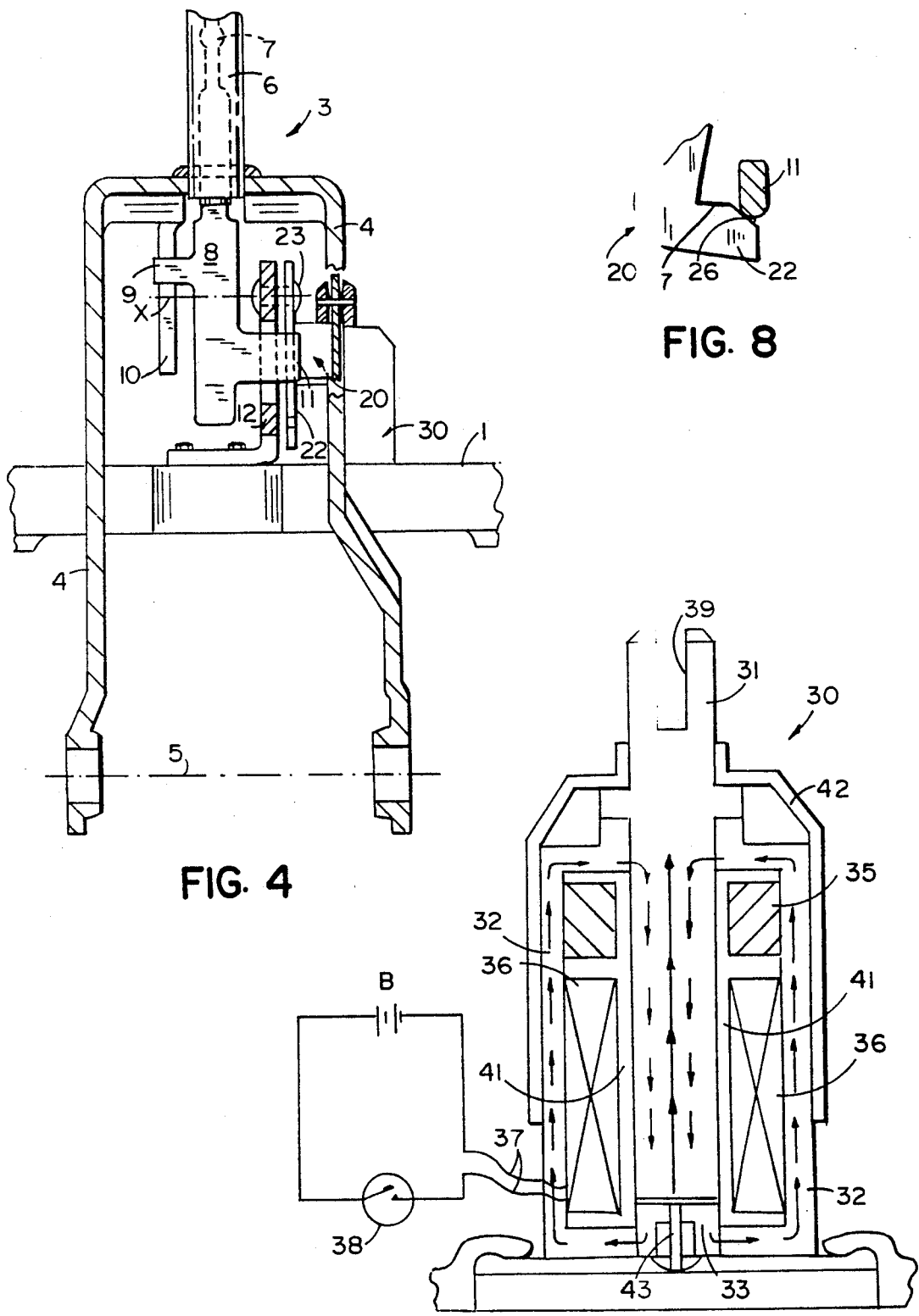

VEHICLE TRANSMISSION SHIFTER WITH PARK LOCK CONTROLLED BY MAGNETIC LATCH

FIELD OF INVENTION

This invention relates to a vehicle transmission shifter mechanism in which the shift lever is movable from one position to different positions for controlling the transmission of the vehicle and which includes a unique locking means for preventing the shift lever from being shifted from a park position to neutral, reverse, and other drive positions.

BACKGROUND OF THE INVENTION

In recent years, it has become mandatory under rules and regulations governing the shifting of transmission shifters for vehicles to require a safety feature in which the shift lever cannot be shifted out of park until the brake has been applied and/or until the steering column has been unlocked. Numerous different constructions have been developed and suggested for preventing such shifting of the shift lever. These constructions have in the past been very complicated and have required extensive modification of existing shifting mechanisms Further, most of these systems have involved solenoids in which current is constantly applied to the solenoid to hold the locking means in a locked position for preventing the shifting of the shift lever.

In addition, prior park lock and ignition key lock mechanisms have been quite noisy and, therefore, undesirable from the noise standpoint of view. In addition, prior art constructions have been extremely expensive because of their complications and particularly, because of the number of parts involved in the assembly work involved in assembling all of the parts.

Further, to my knowledge, no locking mechanisms have been devised which can be easily incorporated in existing shifters Therefore, it has become desirable to provide for a simple arrangement of a means for locking the shifting lever in the park position until the brake has been applied and/or the ignition key has been turned unlocking the steering column.

An object of this invention is to provide a simplified locking system which requires a minimum number of parts, is relatively inexpensive, and is less noisy than most prior art structures.

SUMMARY OF THE INVENTION

In accordance with the present invention, a means for locking the shift lever in park position is provided by two major parts. The most important part is a magnetic latch which can be one of many different types of latches in which the locking function is accomplished by holding an armature in place with a permanent magnet and releasing the armature by energizing a coil that opposes the magnetic flux produced by the permanent magnet.

Attached to the armature is a means for operatively connecting it to the shift lever whereby when the coil is energized the armature is free to be moved along with the movement of the shift lever.

More particularly, a locking arm is provided connected to the armature at one end and at the other end, the arm, which is pivoted between the two ends, is engageable by the pawl of the shift lever. When the armature is released from being held by the permanent magnet, the pawl is capable of pivoting the arm out of the locking position permitting the shift lever to be moved from park to reverse, neutral and other drive positions.

Also, within a more specific aspect of this invention, the pawl and the end of the arm which it engages are configured to provide surfaces whereby the pawl in rotating the arm slips over the extreme end of the arm to move from the park to the reverse, neutral, and other drive positions.

The shift mechanism of my invention is combined with an electrical current source connected to a switch for providing current to the magnetic latch only in response to sporadic actuation of an operative device by an operator, such operative device being, for example, a brake that actuates the switch to supply a current to the coil of the magnetic latch. Accordingly, electrical current is supplied to the shift mechanism only sporadically during the operation of the vehicle.

BRIEF DESCRIPTION OF THE DRAWINGS

Reference will now be made to the accompanying drawings wherein:

FIG. 4 is a cross-sectional view taken along the plane IV—IV of FIG. 2;

FIG. 8 is a partial view of the pawl and one end of the locking arm illustrating the pawl having pivoted the arm very slightly and at the same time, sliding off the end of the arm so as to move into the reverse, neutral or driving positions; and FIG. 9 is a cross-sectional elevational view of the magnetic latch forming a part of my invention.

DESCRIPTION OF THE INVENTION

Figure 1:
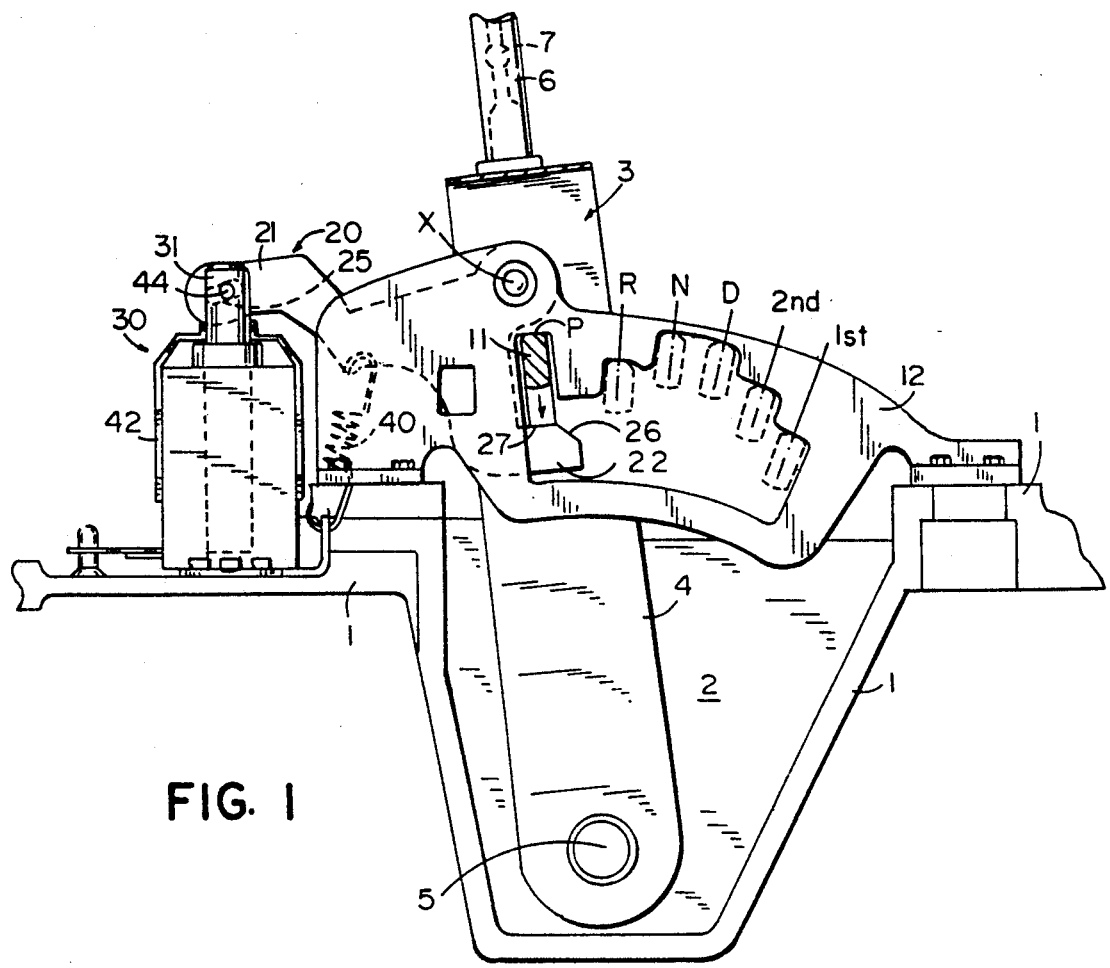
FIG. 1 a side-elevational view of my shift mechanism.

Referring to the drawings, FIG. 1 discloses my transmission shifting mechanism which includes the base 1 shaped to provide a well 2 in which is pivotally mounted the shifting lever 3. Lever 3 includes the inverted U-shaped member 4 (FIG. 4) pivoted on the frame 1 about the axis 5. The shift lever 3 also includes the tubular handle 6 in which is located the so-called "straw" 7 connected to the pawl member 8 for actuating the same. Pawl member 8 is a relatively flat elongated member having a guide protrusion 9 extending from one side between two guide members 10, only one of which is shown. At the lower end of the elongated member is another protrusion or detent 11 which is that portion of the pawl that extends into the notches of the detent plate 12. As designated in FIGS. 1 and 3, notch "P" is the park position, notch "R" is the reverse position, notch "N" is the neutral position, notch "D" is the drive position, notch "2nd" is the second gear position and notch "1st" is the first gear position. The detent 11 of the pawl 8 is movable from the park "P" position to reverse "R", neutral "N", drive "D", second gear "2nd", and first gear "1st" by exerting a downward force on the straw 7 which pushes the detent out of the notch "P" into any of the other notches as desired. As disclosed in FIGS. 1 and 3, the detent plate 12 is mounted on the base 1 and is stationary thereon as is well known in the art. It should be understood that the shift lever 3 cannot be moved or rotated to any of the notches "R", "N", "D", "2nd", and "1st" until the pawl detent 11 is pushed downwardly so as to escape from the park notch "P".

Figure 2:
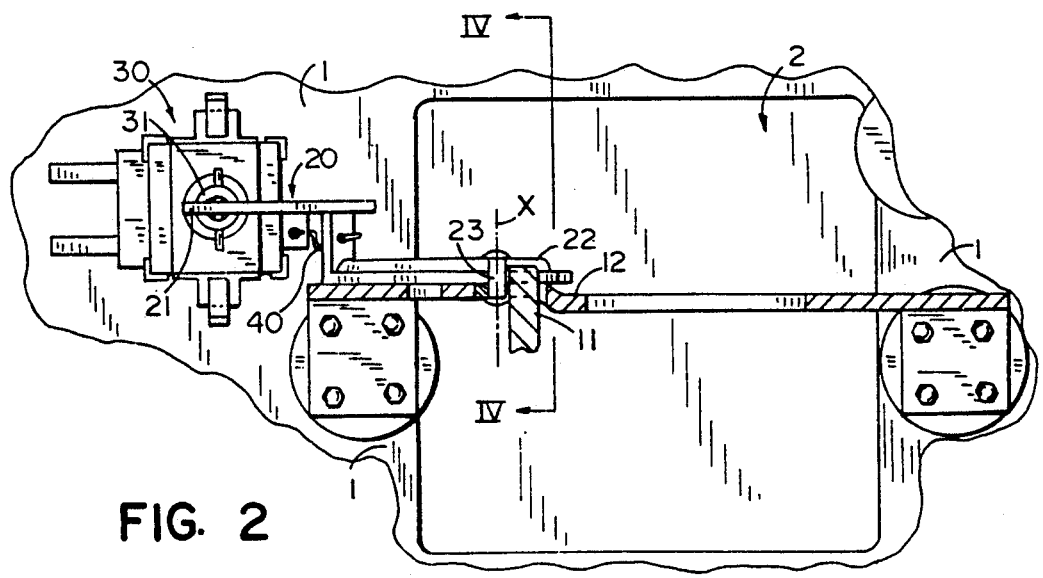
FIG. 2 is a partial, top plan view of my shift mechanism.
Figure 5:
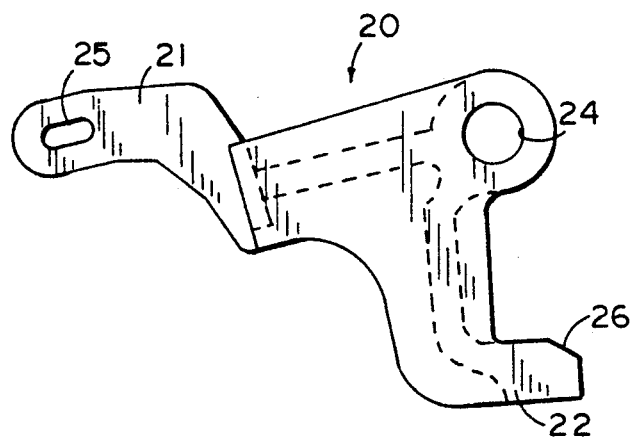
FIG. 5 a side-elevational view of the locking arm which forms of my shift mechanism.
Figure 7:
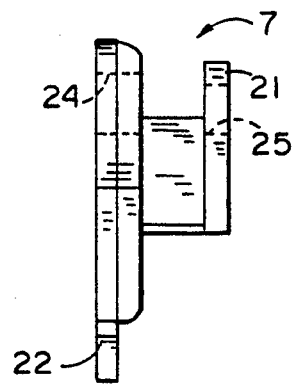
FIG. 7 is a rear-elevational view of the locking arm of FIG. 5.
Figure 6:
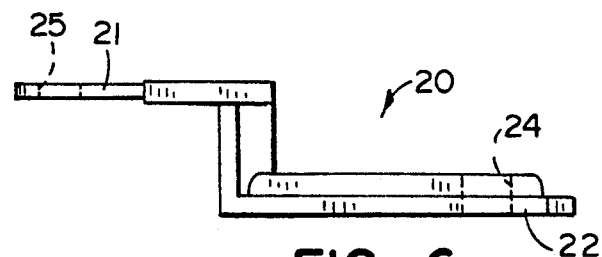
FIG. 6 is a top plan view of the locking arm of FIG. 5.

Pivotally mounted on the detent plate 12 is a locking arm 20, the construction and shape being shown in FIGS. 5, 6, and 7. The locking arm is shaped like a bell crank and includes the two end portions 21 and 22 which, as disclosed in FIGS. 6 and 7, are offset from each other. The locking arm 20 is pivotable between its ends by a pin 23 (FIGS. 2 and 4) extending through an opening 24. The end 21 has an elongated slot 25 for receiving a pin as will be disclosed hereinafter. The end 22 is specially shaped with a chamfered surface 26 provided especially for the detent 11 to easily slide off the end as the arm 20 rotates as will be described in more detail hereinafter.

The end 21 is attached to an upstanding magnetic latch 30 which includes an armature 31 that is normally held in a distended position by a permanent magnet and is released from such holding power of the permanent magnet by producing a magnetic flux in the opposite direction of the magnetic flux produced by the permanent magnet. End 21 extends into the slot 39 in the top end of armature 31 and is slideably retained therein by a pin 44 over which the end 21 slides by means of the slot 25.

FIG. 9 discloses the construction of the magnetic latch 30 which includes the armature 31 mounted in a casing 32 for sliding movement upward and downwardly. The casing 32 and the armature 31 are both constructed of a material having a high magnetic permeability so as to conduct magnetic flux without retaining. Located in the casing 32 is a toroidal-shaped permanent magnet 35 and a pole piece 33 which has an opening 43 for exposing the space under the armature 31 to the ambient air to eliminate a vacuum condition in such space which would tend to hold the armature in the casing 32 which produces a magnetic flux that flows through casing 32 and the armature 31 creating a force that holds the armature 31 downwardly in the casing 32 in the position as disclosed in FIG. 9. Also enclosed within a housing is the coil 36 surrounding armature 31 and connected to the leads 37 which, in turn, are connected to the battery B of the vehicle. The permanent magnet 35 and coil 36 are supported by a bobbin 41 which also provides a bore in which the armature 31 slides. A brake switch 38 is located in the circuit of the battery B and when the brake is applied, switch 38 is closed causing current to flow through the leads 37 to the coil 36 which produces a magnetic flux in opposition to the magnetic flux of the magnet 35.

In FIG. 9, the magnetic flux of the permanent magnet 35 is designated by the broken lines and arrows whereas the magnetic flux produced by the coil 36 is designated by the solid line and arrows. The magnetic flux created or produced by the coil 36 is sufficient to produce a magnetic force which is substantially equal to the magnetic force produced by the magnet 35 and, as a result, when current is applied to the electrical leads 37 of the coil 36 by closing of the brake switch 38, the armature 31 is in effect floating within the casing 41 permitting the armature 31 to be easily forced upwardly. In order to eliminate any possibility of the armature 31 inadvertently and prematurely moving upwardly before the coil 36 is energized, a relatively weak spring 40 (FIG. 1) is provided to apply a very small force downwardly on the armature 31. The force of spring 40 is not sufficient to prevent detent 11 from pivoting arm 20.

Figure 3:
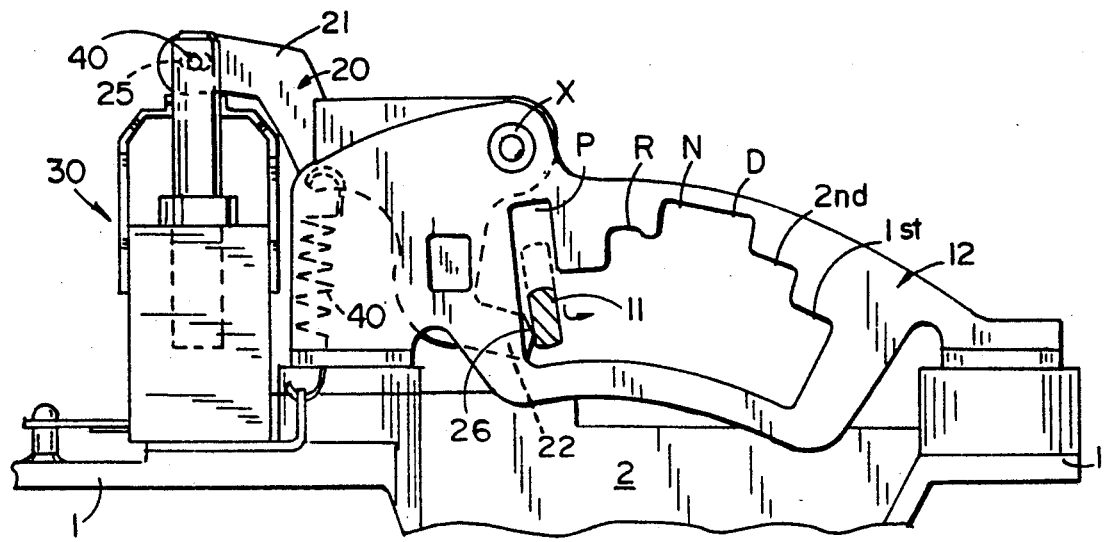
FIG. 3 is a partial side-elevational view of the upper end of my shift mechanism illustrating the pawl being moved out of the park position so as to permit the shift lever to be shifted.

In a semi-floating state of the armature 31, a force applied to detent 11 against the end 22 of the arm 20 will rotate the arm 20. This is accomplished as disclosed in FIG. 8 by the shape of the engaging surfaces of the detent 11 and the chamfered surface 26 which causes the detent 11 to slide off the end 22 of the arm 20 as illustrated both in FIGS. 3 and 8. FIG. 8 discloses the detent 11 just starting to slide off the chamfered surface 26 of the end 22 simultaneously with the pivoting of the arm 20. FIG. 3 discloses the detent 11 having slid past the chamfered surface 26 and in a position whereby the shift lever 6 can be pivoted in a clockwise direction as viewed in FIGS. 1 and 3 for shifting the transmission to one of any of the positions "R", "N", "D", "2nd", and "1st".

A cover 42 is mounted over the casing 32. It is constructed of ah extremely low magnetic permeable material so that it shields the magnetic latch from dust, liquid, paper clips, and any other debris that may be under the console in which the shift is mounted. The cover serves the function of minimizing the possibility of the permanent magnet attracting all sorts of magnetic particles which in time might get into the space between the plunger and coil and cause a binding condition.

OPERATION

Having disclosed the details of my shift mechanism, the operation should be evident. In the park position as shown in FIG. 1, the locking arm 20 is in a position with the end 22 located to prevent the detent 11 of the pawl 8 from being pushed out of the notch "P" which is the park position notch. In this position and with the coil 36 unenergized, any force applied on the detent element 11 by the straw 7 will not pivot arm 20 and, as a result, it is impossible to shift lever 6. However, when the brake 38 is applied closing its switch, current from the battery B is applied to coil 36 through the leads 37 creating a magnetic flux which opposes the magnetic flux created by the permanent magnet 35. Although a very slight force is exerted by the spring 40 to hold the armature 31 down, a force exerted through the straw 7 on the pawl 8 and its detent 11 causes the lower arcuate surface of element 11 to engage the juncture of the chamfered surface 26 and the straight surface 27 causing the locking arm 20 to start to rotate. As arm 20 starts to rotate, detent 11 slides over the chamfered surface 26 (FIG. 8) until it slides past the extreme end 22 of the arm 20 (FIG. 3). In this position of FIG. 3, the shift lever can be shifted in a clockwise direction into any one of the notches "R", "N", "D", "2nd", and "1st".

As previously stated, this construction provides a lockout means Which does not require a constant supply of current to lock the shift lever in the park position. It further does not create any noise as frequently encountered in park lockout mechanisms. Further, it makes for an easy and smooth actuation of the pawl for moving the lockout arm out of the locking position by virtue of the cooperative surfaces of both the detent 11 and the surfaces 26 and 27 of the end 22 of the arm 20.

It should also be evident that the construction as disclosed can be incorporated on many different types of shifting mechanisms without requiring a complete revamping and redesign of the shifter. In addition, the present invention provides for a protective cover on the magnetic latch to shield it from dust, liquid, paper clips, and other debris that may be under the console in which the shifter is located. Being constructed of an extremely low magnetic permeability, it minimizes the possibility of the magnet attracting all sorts of magnetic particles and getting into the space between the plunger and the coil causing a binding condition.

It will be appreciated by those skilled in the art that various modifications can be made in the apparatus described. For example, other designs of a magnetic latch could be used without departing from the spirit of this invention.

The embodiments of the invention in which an exclusive property or privilege is claimed are defined as follows:

1. A shift mechanism for the transmission of a vehicle, such mechanism including a shift lever movable from one position to different positions for controlling said transmission;
   a magnetic latch for preventing the shifting of said shift lever from said one position;
   said magnetic latch having an armature operatively connected to said shift lever; said magnetic latch also having a permanent magnet for producing a magnetic flux to produce a holding force to hold said armature and shift lever in locked position;
   said magnetic latch having a coil for producing magnetic flux opposing said magnetic flux produced by said permanent magnet whereby applying an electrical current to said coil to energize the same destroys the holding force of said magnet on said armature to permit said shift lever to be shifted from said one position to different positions.

2. The shift mechanism of claim 1 in which said shift lever is operatively connected to said magnetic latch by a pivoted arm having two ends and means therebetween for pivoting the same, one end of said arm being connected to said armature and the other end of said arm being operatively connected to said shift lever.

3. The shift lever of claim 2 in which said shift lever includes a pawl member movable with said shift lever, said pawl member being movable relative to said shift lever for engaging said other end of said arm and pivoting said arm when said coil is energized.

4. The shift mechanism of claim 3 in which the other end of said arm and the pawl member are shaped relative to each other whereby as the pawl member engages said other end and said arm pivots, the pawl slips over said other end.

5. The shift mechanism of claim 4 in which said other end includes a chamfered portion and said pawl member includes an arcuate portion which engages said chamfered portion over which it slips.

6. In combination with the shift mechanism of claim 1; an electrical current source; a switch electrically connected to said current source for providing current to said magnetic latch only in response to sporadic actuation of an operative device by an operation of said vehicle whereby electrical current is supplied to said shift mechanism only sporadically during the operation of said vehicle.

7. The shift mechanism of claim 1 in which a non-magnetic permeable cover is provided to shield the magnetic latch.

8. A shift mechanism for the transmission of a vehicle, such mechanism including a shift lever movable from one position to different positions for controlling said transmission;
   a locking means for preventing said shift lever from being movable from said one position;
   a magnetic latch having an armature operatively connected to said locking means, said magnetic latch also having a permanent magnet for producing a magnetic flux to produce a holding force to hold said armature and locking means in locked position;
   said magnetic latch having a coil for producing magnetic flux opposing said magnetic flux produced by said permanent magnet whereby applying an electrical current to said coil destroys the holding force of said magnet to permit said armature and locking means to be released from locked position thus permitting the shifting of said shift lever from said one position to a different position.

9. The shift mechanism of claim 8 in which said locking means includes a pivoted arm having two ends and means therebetween for pivoting the same, one end of said arm being connected to said armature and the other end of said arm being operatively connected to said shift lever.

10. The shift lever of claim 9 in which said shift lever includes a pawl member movable with said shift lever, said pawl member being movable relative to said shift lever for engaging said other end of said arm and pivoting said arm when said coil is energized.

11. The shift mechanism of claim 10 in which said other end includes a chamfered portion and said pawl member includes an arcuate portion which engages said chamfered portion over which it slips.

12. In combination with the shift mechanism of claim 8 an electrical current source; a switch electrically connected to said current source for providing current to said magnetic latch only in response to sporadic actuation of an operative device by an operation of said vehicle whereby electrical current is supplied to said shift mechanism only sporadically during the operation of said vehicle.

13. The shift mechanism of claim 8 in which a non-magnetic permeable cover is provided to shield the magnetic latch.

14. A shift mechanism for the transmission of a vehicle, such mechanism including a shift lever movable from one position to different positions for controlling said transmission;
   a first member movable with said shift lever and in said one position preventing the movement of said shift lever;
   said first member being movable relative to said shift lever to a second position for permitting the movement of said shift lever to a different position;
   a locking member for blocking the movement of said first member from said first position to said second position, said locking member being movable by movement of said first member from said first position to said second position;
   a magnetic latch for preventing said movement of said locking member by said first member;
   said magnetic latch having an armature operatively connected to said locking member and a permanent magnet for producing a magnetic flux to produce a holding force for holding said armature and locking member in locked position;

said magnetic latch having a coil which when energized produces magnetic flux opposing said magnetic flux produced by said permanent magnet whereby applying an electrical current to said coil destroys the holding force of said magnet to permit said first member when moved relative to said shift lever to move said locking member and said armature attached thereto thus permitting the shifting of said shift lever from said one position to a different position.

15. The shift mechanism of claim 14 in which said locking member is a pivoted arm having two ends and means therebetween for pivoting the same, one end of said arm being connected to said armature and the other end of said arm being operatively connected to said shift lever.

16. The shift mechanism of claim 15 in which said first member is a pawl for engaging said other end of said arm and pivoting said arm when said coil is energized.

17. The shift mechanism of claim 16 in which the other end of said arm and the pawl member are shaped relative to each other whereby as the pawl member engages said other end and said arm pivots, the pawl slips over said other end.

18. The shift mechanism of claim 17 in which said other end includes a chamfered portion and said pawl member includes an arcuate portion which engages said chamfered portion over which it slips.

19. The shift mechanism of claim 14 in which a non-magnetic permeable cover is provided to shield the magnetic latch.

* * * * *

UNITED STATES PATENT AND TRADEMARK OFFICE
CERTIFICATE OF CORRECTION

PATENT NO. : 5,275,065
DATED : January 4, 1994
INVENTOR(S) : Andrew K. Ruiter

It is certified that error appears in the above-indentified patent and that said Letters Patent is hereby corrected as shown below:

Column 1, line 24:
    After "mechanisms" insert --.--.

Column 1, line 38:
    After "shifters" insert --.--.

Column 2, line 33:
    After "forms" insert --a part--.

Column 4, line 24:
    "of ah" should be --of an--.

Column 4, line 59:
    "Which" should be --which--.

Signed and Sealed this

Sixteenth Day of August, 1994

Attest:

BRUCE LEHMAN

Attesting Officer

Commissioner of Patents and Trademarks